United States Patent Office 3,469,271
Patented Sept. 30, 1969

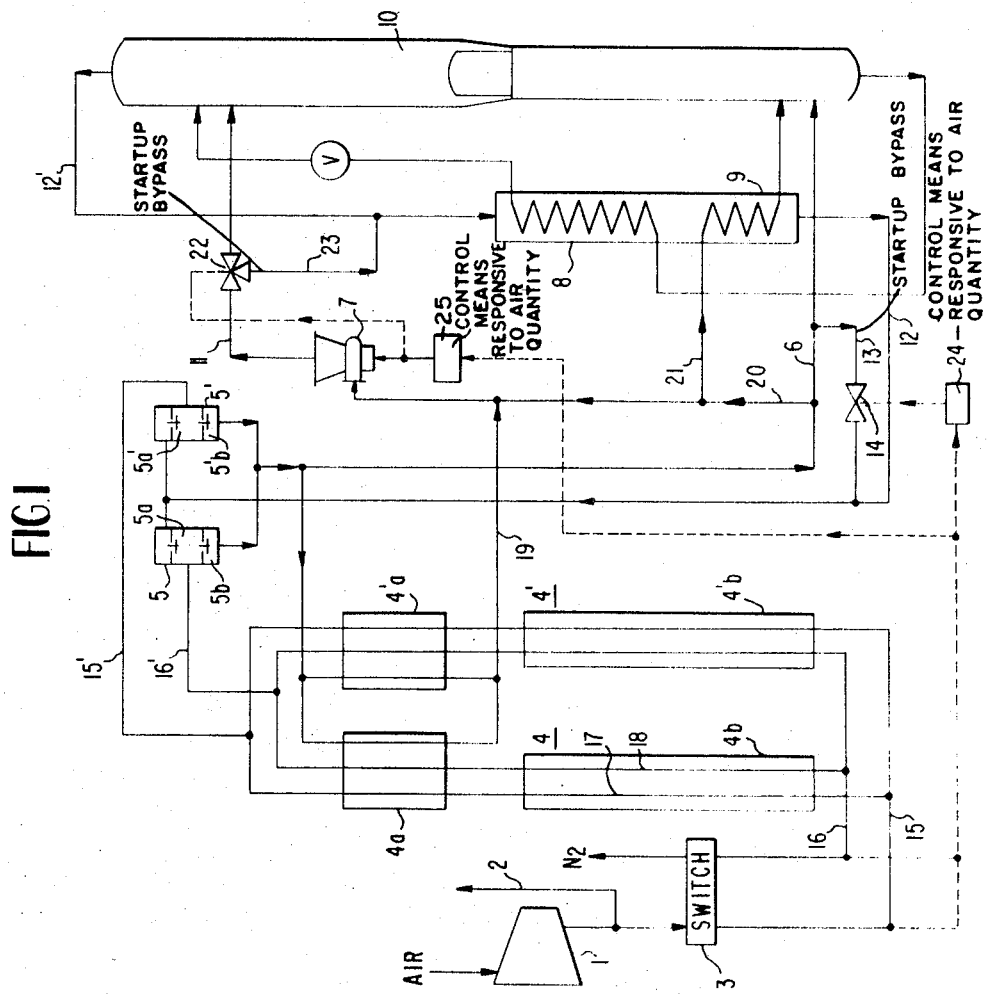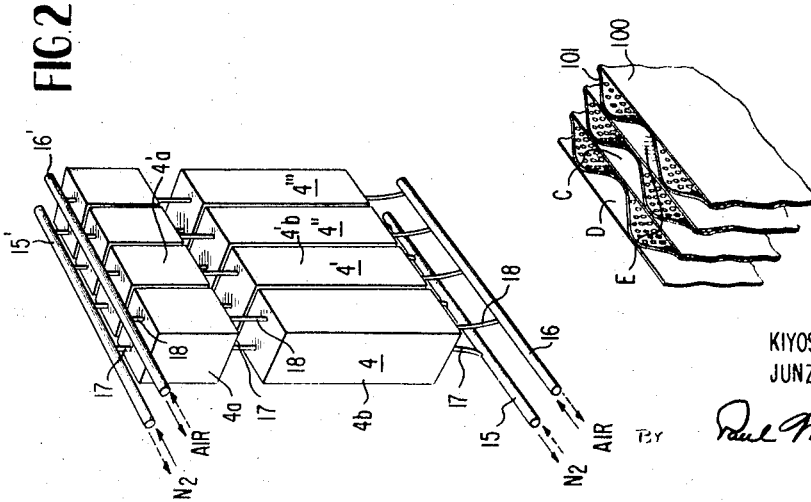

3,469,271
PROCESS AND APPARATUS FOR LOW BOILING GAS MIXTURES
Kiyoshi Ichihara and Junzo Kitamura, Hitachi-shi, Japan, assignors to Hitachi, Limited, Tokyo-to, Japan
Filed Nov. 14, 1966, Ser. No. 593,883
Claims priority, application Japan, Nov. 15, 1965, 40/69,748
Int. Cl. F25j 5/00
U.S. Cl. 62—13                                           11 Claims

ABSTRACT OF THE DISCLOSURE

The present disclosure is directed to a process and apparatus for separating gas mixtures by utilizing liquefication, and rectification including a reversible heat exchanger, wherein the improvement comprises the step of adding such an amount of compressed gas mixtures to the separated product gas during the starting period of the process so that the heat exchanger is provided with substantially the same flow therethrough during starting as the normal rate flow so as to avoid undesired partial deposit of water and carbon dioxide in the heat exchanger during the starting operation.

---

The present invention relates to a process and an apparatus for separating gas mixtures containing constituents having different low boiling points and to the removal from such gas mixtures of constituents which tend to solidify under the conditions prevailing during the separation process.

More particularly, the invention relates to the separation of air into nitrogen and oxygen, and involves the removal of water and $CO_2$ (carbon dioxide) therefrom during the cooling process of the incoming air by means of solidification and vaporization (or sublimation) in a reversible heat exchanger.

The particular problems effectively solved by the inventors and the features of the invention will be best understood in connection with the following description considered in conjunction with the attached drawings, in which:

FIGURE 1 is a schematic diagram of an air separation apparatus embodying the teachings of the invention;

FIGURE 2 is a perspective view of a reversible heat exchanger employed in the apparatus of the invention;

FIGURE 3 is an explanatory partial perspective view of a heat exchanger block of aluminum plate type, and serves to illustrate the nature of the problems solved by the present invention.

Compressed air to be separated contains both nitrogen and oxygen as well as other minor constituents, such as water and $CO_2$ which have much higher boiling points than nitrogen and oxygen. These constituents tend to solidify during the cooling process of the incoming air and the deposits of frozen water and $CO_2$ tend to rapidly plug up the passage for the incoming air. Therefore, removal of the deposits is a requisite for continuous air separation. To solve this problem reversible regenerators (or cold accumulators) packed with pebbles have been used in air separation plants in the past in which passages for the incoming air and a separated product gas are alternately switched from one passageway to another and back. With such an arrangement the separated product gas serves as a coolant for the incoming compressed air to cause deposits of the minor constituents in one passageway for a predetermined period. During the alternate period the two passageways are switched so that the one that previously carried compressed air now carries the coolant separated product gas, and vice versa. As a consequence, during the alternate period, the deposits are thawed out by sublimation and entrained into the separated product gas. In this manner the deposits are prevented from building up and clogging the passageways.

Instead of regenerators of the above mentioned type, reversible heat exchangers of the metal plate type are coming into wide spread use. One of the most used reversible heat exchangers is an aluminum plate type, partially shown in FIGURE 3, in which a multiplicity of corrugated and perforated aluminum fins 101 and plates 100 are stacked alternatively in tiers and soldered to form a sort of honeycomb sandwich structure. This structure results in forming a multiplicity of small passages C, D, and E between plates 100, each passage including the perforated and corrugated fin, through which the incoming air and separated gases pass separately. The heat exchangers of this type have many advantages over the regenerators. For example, for comparable sized units that handle the same quantity of incoming air, an aluminum plate heat exchanger can be constructed in one-fourth the size required to build a regenerator. Also, the time needed to start a plant is reduced by employing a heat exchanger of this type to about 20~30 hours from the 40–60 hours required to start a plant employing regenerators. While aluminum plate heat exchangers are preferred, other metals such as copper, steel, may, of course, be used to fabricate the heat exchangers.

The function of the heat exchangers in air separation plants is similar to the regenerators heretofore employed. In a heat exchanger, the incoming compresed air to be separated exchanges its heat with a separated product gas or gases and the incoming air of about normal room temperature is cooled to near the saturated or boiling tempearture ($-171°$ C.~$-172°$ C.) while passing therethrough. At the same time, minor constituents which solidify easily at these temperatures, deposit on the surface of the small passages in the heat exchanger as shown at C and E in FIGURE 3. Since these deposits tend to plug up the passages, the passages for the incoming air and the passages for the separated product gas have to be switched alternately from one to the other at predetermined intervals. Because of the difference in pressure between the incoming compressed air and the separated product gas, the deposits now in the passage through which the product gas flows, sublimate into gaseous form and are entrained into the flow of the product gas. In this manner they are thawed out from the heat exchanger and prevented from building up and clogging the heat exchanger.

Subsequent to cooling, the cooled compressed air is supplied to liquefication and rectification process stages as is well known in the art. By this process, continuous separation of air into $N_2$ and $O_2$ is accomplished.

It has been found impractical or impossible to construct a heat exchanger of the aluminum plate type of larger capacity than of 700~800 millimeter square in cross section because of its complicatedly combined honeycomb structure of corrugated fins and plates. Increase in the capacity causes greatly multiplied expense in the construction as well as multiplied mechanical weakness in the structure. In order to construct an air separation plant of large handling capacity, therefore, it is practical to employ numbers of smaller heat exchangers of this type to comprise a multiplicity (several to several tens) of heat exchanger blocks connected in parallel relationship with each other. Such an arrangement is shown in FIGURE 2 in which four heat exchanger blocks 4, 4', 4'', 4''' are employed. In the blocks, corresponding inlet and outlet passages 17, 18 of a block 4 for the separate small passageways C, E and D (shown in FIGURE 3) are connected with respective header pipes 15, 16, 15', 16' in parallel with passages of the other blocks.

In air separation plants where an installation of several heat exchanger blocks is employed, it has been experienced that breakage or serious damage of some of the blocks tends to take place and the overall efficiency of the plant was lower than expected. Looking into the actual operation of the plants, the inventors found that inlet passages 17, 18 or small passages such as C shown in FIGURE 3 for the individual blocks were much more rapidly plugged up by the deposits of frozen water and $CO_2$ than other passages or other small passages, i.e. D, E. These partial or unbalanced deposits tended to amount to such an extent that the removal of the deposits by the separated gas in the alternate operating interval was impossible. As a consequence, some of the passages become completely plugged up, and there occurred a serious accident as previously indicated as well as a drop in the heat exchanging efficiency.

These unbalanced or partial deposits were found to be caused especially during the starting period by a partial flow of the incoming air in the blocks or in the small passages of some blocks. It is usual to construct a heat exchanger in such a manner that there takes place a balanced and stable flow in the blocks and in all the small passages of each block when a normal rate flow is supplied thereto. During the starting period, which can amount to a couple of days, however, the flow of the incoming air, as well as the separated gases, is far below the value of the normal rate flow so that there tends to take place the partial flow phenomenon observed above. In this partial flow phenomenon, for instance, a greater amount of flow takes place in the passage of a block that is positioned farther away from the inlet of a header pipe than in those closer to the header pipe. This is due to the inertia of flow. For example, in FIGURE 2, the block 4''' receives more flow than the blocks 4, 4', 4''.

The same partial flow phenomenon may take place among the small passages C, D, E in each block when the incoming flow in the block is below the normal rate flow.

As a result, unbalanced or partial deposits take place among the blocks and also among the small passages in each block. The deposits increase the resistance against the flow of the product gas in the next cycle so that the removal of the deposits gets harder and harder. This problem appears to be peculiar to the parallel connection of heat exchanger blocks and have not been so seriously encountered with the regenerators described briefly above.

It is therefore a primary object of the invention to provide a gas mixture separation plant using a reversible heat exchanger in which the above defects arising during the starting operation are avoided and the overall efficiency of the plant is improved.

Another object of the invention is to provide a process and an apparatus for air separation plants in which gas flow in each passage of the blocks in a reversible heat exchanger is balanced with others not only during the normal rate flow operation period but during the starting operation period of the plants.

In practicing the invention an air separation plant employing a reversible heat exchanger of aluminum plate type is made available in which a sufficient amount of incoming compressed air flow is provided during the starting operation period so as to maintain the flow rate during the starting period substantially the same as during the normal rate operation period.

These and other advantages and features of the invention will become apparent from the following description:

According to an embodiment of the invention shown in FIGURE 1, a reversible heat exchanger of the aluminum plate type is provided with substantially the same air flow during the starting operation period as during the normal rate operation period by means of a by-pass valve and conduit provided between a passage for cooled compressed air and a passage for a separated product gas.

In FIGURE 1, the numeral 1 denotes a compressor for compressing incoming air so as to provide a desired pressure, and 2 is a conduit connected to the output of the compressor 1 and provided with a valve (not shown) for relieving a portion of the compressed air. According to this invention this conduit 2 may be omitted because in accordance with the invention, the heat exchangers may always be provided with the substantial normal rate flow. 3 is switching means for automatically or manually alternately switching passages 15, 16 for the incoming air and for a separated product gas, one to the other, at predetermined or desired intervals. A reversible heat exchanger 4 of aluminum plate type, as shown in FIGURE 2 is comprised by several exchanger blocks 4, 4', 4'', 4''' through only two blocks 4 and 4' are shown in the drawing. Each block includes a lower part or warm block 4b or 4b' and an upper part of cold block 4a or 4a'. Each block is provided with a pair of passages 17, 18 which are divided in each block into a multiplicity of small passages as shown in FIGURE 3. Inlet or outlet passages 17, 18 are connected in parallel by header pipes 15, 16, 15', 16' with the corresponding passages of other blocks, respectively, and the header pipes 15, 16, 15', 16', may be considered common passages as shown in FIGURE 1. At the other end of the passages 15', 16', a pair of one-way or check valve means 5, 5' are provided each of which includes one-way valves 5a, 5b operable by pressure and which help the switching over operation of the passages 15, 16 in cooperation with the switching means 3.

A part of the compresed air which was cooled through the heat exchangers 4 will be led to a lower portion of a rectifier 10 through a passage 6. Another part of the cooled and compressed air is led through a passage 20 to an expansion turbine 7 to cool further by adiabatic expansion. 8 is a liquid air super coler, 9 is a liquefier receiving a part of cooled and compressed air through a passage 21 and 10 is the rectifier having two stages of separation. Air of lower temperatures and lower pressures from the expansion turbine 7 will be led to an upper part of the rectifier 10 through a passage 11 and a valve means 22.

Separated nitrogen gas which may include some impurities is taken out from the top of the rectifier 10 through a passage 12' and is led to the valve means 5 through the super refrigerator 8, the liquefier 9, and a passage 12. A part of the air from the expension turbine 7 may be led to the passage 12' through the valve means 22 and a passage 23 and also part of the air from the valve means 5, 5' may be cooled further by the cold blocks 4a, 4a' and led to the expansion turbine 7 through a passage 19. Passages and apparatuses for separated oxygen from the rectifier are not shown in the drawing for the sake of simplicity. It is believed obvious to those skilled in the art that other heat exchangers may be employed or the heat exchanger 4 may be designed to include passages for oxygen.

It is necessary to cool the whole plant to a desired temperature during the beginning of the starting operation. For this purpose, the expansion turbine 7 works to cool the incoming air through the path 11–22–23–12'–12. However, the capacity or handling amount of expansion turbine 7 is normally designed only about 30~50% of the normal rate flow of the incoming air because during the normal operation of the plant it is required to handle only about 15% of the normal rate flow. Therefore, during most of the starting period the amount of the incoming air to the heat exchanger 4 is at most 50% of the normal rate flow. From the viewpoint of the heat (or coldness) balance of the plant, the amount of the cooled air the expansion turbine 7 handles is controlled to decrease from the middle of the starting operation. This is usually accomplished by a time scheduled control means 25. Therefore, during the starting operation heretofore there inevitably takes place a partial flow phenomenon, which cannot be avoided by additional controllable valve means especially in small passages in each heat exchanger block.

According to this embodiment of the invention, between the passage 6 for the cooled and compressed air and the passage 12 for the separated nitrogen, a by-pass passage 13 is provided which includes a controllable expansion valve means 14. The valve means 14 is controlled by control means 24 which detects the flow of the incoming air to the heat exchanger 4 and controls the opening of valve means 14 accordingly as shown by dotted lines. During the starting period, the amount of the incoming air which can be handled essentially by the expansion turbine 7 is less than 50% of the normal rate flow as previously explained. By the addition of the by-pass 13, a part of the cooled and compressed air which is substantially equal to the difference from the normal rate flow (50~70%) can be turned back from the passage 6 to the passage 12 through free expansion. That is, outside the expansion turbine 7 and the liquefication and rectification stage there takes place a circulation of the air; 15–5 (5′b)–6–13 (14)–12–5 (5a)–16′.

According to the experiments of the inventors, at least 80% of the normal rate flow of the incoming air is necessary to avoid the partial deposits. Thus, any flow rate which is of about 80% of the normal flow rate is considered to be substantially equal to the normal flow rate. The turned back air which is expanded works to cool the incoming air in the heat exchanger. As a result, the amount of the incoming air in the heat exchanger can be substantially the same as the normal rate flow even during the starting operation and the partial deposits due to reduction in the incoming air flow can be avoided. As a consequence, complete removal of the deposits in the next interval is attained and the passage for the incoming air is prevented from gradually plugging up. Hence, as a result of the invention, there is no fear of accidents caused by the partial deposits. In addition since the efficiency of heat exchange is improved, the time required for starting the plant is made much shorter and the over-all efficiency of the plant is improved.

A by-pass passage 13 employed in the above described embodiment is preferable because of its easy construction and inexpensive character. In addition, the amount to be by-passed can be controlled without the consideration of heat balance of the plant when the compressed air is by-passed through free expansion. However, when the expansion turbine 7 is designed large enough to handle the quantity of the incoming air which is substantially equal to that of the normal rate incoming air flow, and when the heat balance of the plant is adjusted by other means, only the by-pass including the expansion turbine need be used to provide the normal flow of the incoming air to the heat exchanger 4 even during starting. In this case, control means 25 may be preferably utilized to control the incoming air flow similarly to means 24 as shown by dotted lines. Other similar arrangements to supply the normal rate flow even during the starting period will be suggested to those skilled in the art in the light of the above disclosure.

From the foregoing description, it will be appreciated that according to the invention, the partial deposits of minor constituents in the heat exchanger is effectively avoided and, therefore, there is no fear of plugging up passages through the heat exchangers during operation. As a result it is possible to operate air separation plants which employ heat exchangers of the aluminum plate type more efficiently, economically and reliably.

Although the invention has been described in connection with certain embodiments thereof, it is to be understood that further modification, alteration, etc. will be suggested to those skilled in the art; and that it is intended to cover such modifications as fall within the scope of the appended claims.

We claim:
1. In a starting process for separating air containing constituents of different boiling points by a liquefication and rectification process wherein the said starting process includes the steps of cooling the incoming compressed air in a reversible heat exchanger by heat exchange with a cool separated product gas withdrawn as effluent from a low pressure zone of the rectification column and at the same time removing therefrom minor constituents which tend to solidify under the conditions of the separation process, work expanding at least a first portion of the compressed and cooled air prior to said liquefication and rectification, and introducing said work expanded portion of air into the low pressure zone of the rectification column while introducing a second portion of the compressed and cooled air into a high pressure zone of the rectification column, the improvement comprising the step of bypassing an amount of the compressed and cooled air from the reversible heat exchanger prior to introduction of the second portion into the high pressure column and introducing it directly into the separated product gas withdrawn as effluent from the low pressure column during the said starting process, so that the heat exchanger is provided with substantially the same rate flow therethrough during starting as the normal rate flow so as to avoid undesired partial deposit of the minor constituents in the heat exchanger during the starting operation.

2. The process set forth in claim 1 wherein the amounts of compressed air are added to the separated product gas subsequent to cooling and after some expansion.

3. A process according to claim 2 in which the adding step is comprised by a step for adding a part of the compressed and cooled air through work expansion and a step for adding the rest of the compressd and cooled air through free expansion.

4. A process according to claim 3 in which said reversible heat exchanger is comprised by a heat exchanger of aluminum plate type including a plurality of heat exchanging blocks each having at least a pair of passages for the incoming air and the nitrogen gas and said passages are alternately reversed with respect to the air and the gas at predetermined intervals to remove deposits of the minor constituents in one of the passages by sublimation into the nitrogen gas in the next alternate interval.

5. In an apparatus for separating air into oxygen and nitrogen by liquefication and rectification process wherein said apparatus includes a compressor for compressing incoming air; a reversible heat exchanger of metal plate type having a plurality of heat exchanging blocks each having at least first and second passages operatively connected in parallel with the corresponding passages of the other blocks for cooling the incoming compressed air passing through one or the other of the first and second passages by a separated product gas withdrawn as effluent from a low pressure zone of a rectification column and passing through the alternate passage; switching means operatively connected with said reversible heat exchanger for switching the first and second passages alternately to the incoming compressed air and to the separated product gas in accordance with a predetermined cycle schedule; liquefication and rectification means having a high and low pressure stage including a third passage for the compressed aid cooled air and a fourth passage for the separated product gas, both the third and fourth passage being operatively connected between high and low pressure zones of the rectification column respectively, and said reversible heat exchanger; and an expansion turbine operatively communicating with said reversible heat exchanger and said liquefication and rectification means, said expansion turbine having an inlet for compressed and cooled air and an outlet for expanded and further cooled air and said inlet being communicating with the third passage and said outlet communicating with said low pressure zone the improvement comprising by-pass means operatively connected between the output of the reversing heat exchanger at the third passage at a position prior to the inlet expansion turbine and prior in point of flow of compressed air to the high pressure zone for bypassing an amount of the compressed air from the third passage directly into the fourth passage so as to maintain the quantity of incoming air into the heat exchanger at substantially the normal flow rate during the starting operation of the apparatus.

6. An apparatus according to claim 5 wherein the by-pass means is operatively connected between the third passage and the fourth passage and further includes expansion means for by-passing such amount of the compressed and cooled air from the third passage to the fourth passage through expansion as to maintain substantially at the normal flow rate the quantity of the incoming air to the heat exchanger during the starting operation of the apparatus.

7. An apparatus according to claim 6 in which the apparatus further includes an expansion turbine operatively connected between the third passage and the liquefication and rectification means and said by-passing means by-passes such amount of the compressed and cooled air that is substantially equal to the difference between the normal flow rate and the quantity of the incoming air to be handled by said expansion turbine and said liquefication and rectification means so as to maintain substantially at the normal flow rate the quantity of the incoming air to the heat exchanger.

8. An apparatus according to claim 5 in which said by-pass means is comprised by an expansion turbine operatively connected to the third passage and valve means operatively connected both between said expansion turbine and the liquefication and rectification means and between said expansion turbine and the fourth passage for by-passing such amount of the expanded and further cooled air to the fourth passage as to maintain substantially at the normal flow rate the quantity of the incoming air to the heat exchanger.

9. An apparatus according to claim 5 in which said by-pass means include a valve means for expanding said compressed and cooled air through free expansion.

10. An apparatus according to claim 5 in which said apparatus further includes a control means for controlling the amount of compressed air to be by-passed according to the amount of the incoming air to the heat exchanger.

11. An apparatus according to claim 7 further including automatic control means coupled to and controlling said by-pass means in response to the quantity of the incoming air to the heat exchanger.

References Cited
UNITED STATES PATENTS

| | | | |
|---|---|---|---|
| 2,537,046 | 1/1951 | Garbo | 62—38 |
| 2,861,432 | 11/1958 | Hazelden | 62—38 |
| 2,460,859 | 2/1949 | Trumpler | 62—14 |
| 2,513,306 | 7/1950 | Garbo | 62—13 |
| 2,964,914 | 12/1960 | Schuftan | 62—14 |
| 3,127,751 | 4/1964 | Ranke | 62—37 XR |
| 3,143,406 | 8/1964 | Becker | 62—38 XR |

NORMAN YUDKOFF, Primary Examiner

U.S. Cl. X.R.

62—38